(12) United States Patent
Barrett et al.

(10) Patent No.: US 8,747,563 B2
(45) Date of Patent: Jun. 10, 2014

(54) METHOD AND APPARATUS FOR ANTI-FOULING AN ANEMOMETER

(75) Inventors: Ronald M. Barrett, Lawrence, KS (US); Scott E. Cravens, Leawood, KS (US); Travis R. Cravens, Wichita, KS (US)

(73) Assignee: University of Kansas, Lawrence, KS (US)

( * ) Notice: Subject to any disclaimer, the term of this patent is extended or adjusted under 35 U.S.C. 154(b) by 887 days.

(21) Appl. No.: 12/901,475

(22) Filed: Oct. 8, 2010

(65) Prior Publication Data

US 2011/0132398 A1 Jun. 9, 2011

Related U.S. Application Data

(60) Provisional application No. 61/250,380, filed on Oct. 9, 2009.

(51) Int. Cl.
*B08B 7/02* (2006.01)
*B08B 17/02* (2006.01)

(52) U.S. Cl.
USPC .............................................. 134/1

(58) Field of Classification Search
USPC .......... 134/1, 32; 422/20; 73/861.18, 861.19, 73/204.26
See application file for complete search history.

(56) References Cited

U.S. PATENT DOCUMENTS

| | | | |
|---|---|---|---|
| 3,464,269 A * | 9/1969 | Froger | ................. 73/204.22 |
| 5,877,416 A | 3/1999 | Kapartis | |
| 6,840,116 B2 | 1/2005 | Higgins | |
| 7,178,410 B2 | 2/2007 | Fraden et al. | |
| 2005/0012433 A1 | 1/2005 | Brady et al. | |
| 2005/0241413 A1 | 11/2005 | Brandt | |
| 2008/0087102 A1 | 4/2008 | Snell et al. | |
| 2008/0141768 A1 | 6/2008 | Ormel et al. | |

FOREIGN PATENT DOCUMENTS

| | | | |
|---|---|---|---|
| GB | 2128757 A | | 5/1984 |
| JP | 09-054110 A | | 2/1997 |
| JP | 11287681 A | * | 10/1999 |
| JP | 2000146654 A | * | 5/2000 |
| KR | 10-2001-0093459 A | | 10/2001 |

OTHER PUBLICATIONS

Machine translation of JP 2000-146654 to Kato, N. (2000).*
English abstract of JP 11-287681 to Nakabayashi et al. (1999).*
Etebari, Recent Innovations in Wall Shear Stress Sensor Technologies, Recent Patents on Mechanical Engineering 2008, 1, 22-28, Nov. 16, 2007.

* cited by examiner

*Primary Examiner* — Michael Kornakov
*Assistant Examiner* — Natasha Campbell
(74) *Attorney, Agent, or Firm* — Mark E. Stallion, Esq.; Husch Blackwell LLP

(57) ABSTRACT

An apparatus and method for adaptive materials arranged in a variety of orientations and with a wide range of attachment configurations to induce structural vibrations at extremely high frequencies. These mechanical vibrations cause fouling agents to become detached and accordingly "clean" an otherwise dirty element or wire of a hot-wire anemometer, planar or curvilinear sensor surface, or display surfaces. They also can be made to vibrate at such frequencies with such intensities that local droplets of water are either shaken off or instantaneously cavitate, thereby allowing the elements to be used in all weather conditions.

22 Claims, 15 Drawing Sheets

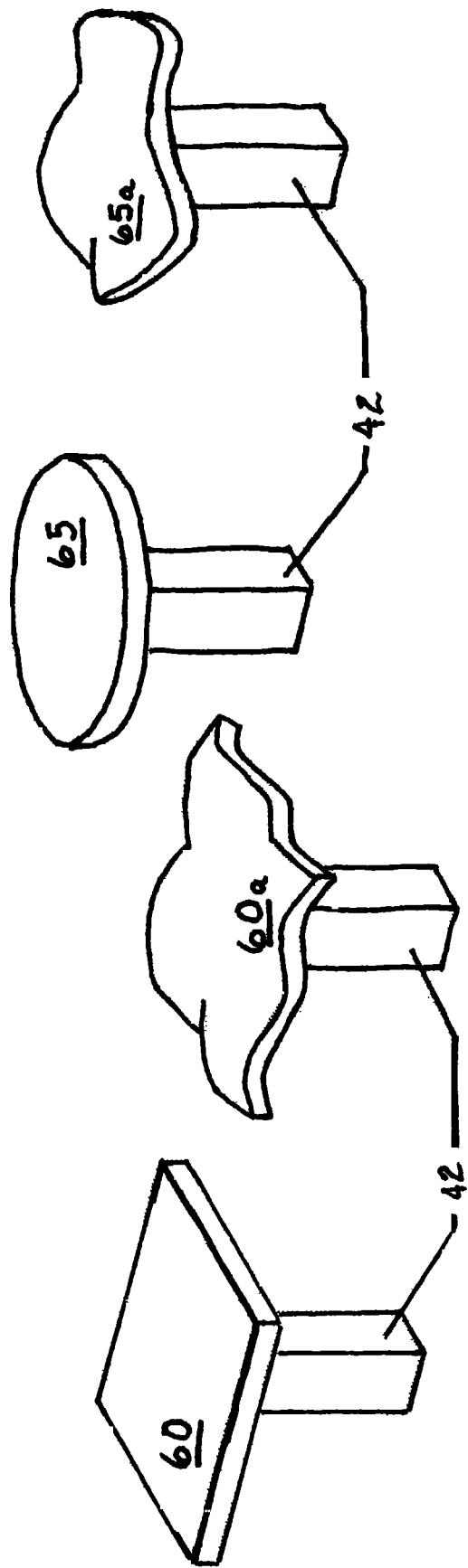

METHOD AND APPARATUS FOR ANTI-FOULING AN ANEMOMETER

CROSS-REFERENCE TO RELATED APPLICATION

This application claims the benefit of and priority to U.S. Provisional Patent Applications Ser. No. 61/250,380, filed Oct. 9, 2009, entitled METHOD AND APPARATUS FOR ANTI-FOULING AN ANEMOMETER, which application is hereby incorporated by reference in its entirety herein.

BACKGROUND OF INVENTION

1. Field of Invention

This invention relates generally to anemometer and generalized sensor fouling and, more particularly, to antifouling of a micro-anemometer.

2. Background Art

An anemometer is a device that is used for measuring wind speed, and fluid flow. Hot-wire anemometers can measure the wind's velocity. There is a close connection between the pressure and the velocity, thus, an anemometer designed for one can give information about both when accompanied by a collocated pressure sensor. One type of anemometer is a Hot Wire anemometer, which uses a very fine wire (on the order of several micrometers) electrically heated up to a predefined temperature above the ambient. Air flowing past the wire has a cooling effect on the wire. As the electrical resistance of most metals is dependent upon the temperature of the metal (tungsten is a popular choice for hot-wires), a relationship can be obtained between the resistance of the wire and the flow velocity. Hot-wire devices can be further classified as CCA (Constant-Current Anemometer), CVA (Constant-Voltage Anemometer) and CTA (Constant-Temperature Anemometer). The voltage output from these anemometers is thus the result of some sort of circuit within the device trying to maintain the specific variable (current, voltage or temperature) constant. Additionally, PWM (pulse-width modulation) anemometers are also used, wherein the velocity is inferred by the time length of a repeating pulse of current that brings the wire up to a specified resistance and then stops until a threshold "floor" is reached, at which time the pulse is sent again.

Hot-wire anemometers having a very fine structure can have a very high frequency-response and fine spatial resolution compared to other measurement methods, and as such are almost universally employed for the detailed study of turbulent flows, or any flow in which rapid velocity fluctuations are of interest. However, a downside to the very fine structure is the problem with fouling. If debris accumulates on the very fine structure, it can significantly affect measurement efficacy of the device.

Hot-wire anemometers are often used to measure fluid velocity and wind speed based on the amount of heat connected away by a fluid or wind passing over a heated wire. In typical hot-wire anemometers, a hot wire or filament is heated by either a constant current (constant-current anemometers) or, alternatively, heated to a constant temperature (constant-temperature anemometers). In either case, the amount of heat lost due to convection is a function of the fluid or wind velocity passing over the filament.

The amount of heat that is dissipated by a heated filament located in a fluid stream depends on a number of factors including the filament's temperature, the geometry of the filament, the temperature, density and type of the fluid, and the fluid velocity. The filament's temperature is determined by measuring its electrical resistance. Empirical data and/or mathematical algorithms are used to calculate the temperature and the flow rate based on the measured resistance. Because metals used to fabricate suitable filaments have resistivity coefficients on the order of 0.1%/.degree. C., a high degree of accuracy is needed for measuring the actual resistance of the filament. However, due to the fact that the filament is exposed to the wind or fluid passing over it, any debris flowing along with the wind or fluid can cause fouling of the wire or an accumulation of debris on the surface of the wire. Again, due to the very fine structure, not much debris is required to negative effect the efficacy of the anemometer.

Measuring flow velocity of fluids and wind can be very helpful in a variety of applications, including for example meteorology or oceanography research, metering, monitoring, and similar applications. Hot-wire anemometers have also proven useful for macroscale measurements. For example, hot-wire anemometers are used to monitor air flow within automobile engines, ventilation and heating ducts, and the like. However, due to the nature of this type of research and the type of debris that can be present and the fine structure of a hot-wire anemometer, which is positioned within the flow of media, such as gas, liquid, particle-laden liquid, or the like, then fouling can be a significant problem require regular maintenance. As the media flows past the hot wire, not only is heat transferred from the hot wire to the media, thus cooling the hot wire, but in addition the wire is typically fouled by debris. Flow can't be accurately determined from the temperature variation effects on the hot wire because the accumulated debris will affect the temperature variation.

Historically, conventional macroscale hot-wire anemometers could not easily be scaled into microscale dimensions. For example, as the scale of components was reduced, the components became fragile and be easily damaged during the fabrication process. However, micro and nano-anemometers are now being developed, thus there is a need to resolve the fouling issue.

Again, as mentioned above, operation of the hot wire nano-anemometer occurs when media is introduced into the open space between the electrodes so it flows past and envelops the nanowire. The nanowire may be heated, for example, by passing an electrical current through the nanowire. As the media flows past the nanowire, it will remove heat from the nanowire. Flow rate of the media can be inferred by measuring the effects of this heat loss. One technique is to measure a temperature decrease of the nanowire resulting from the media flow using the sensing apparatus. For higher flow rates, greater temperature decreases will occur. Alternately, the nanowire can be held at a constant voltage or current by the sensing apparatus, and resistance changes due to temperature changes determined from which the flow rate can be inferred. As yet another example, the nanowire may be held at an approximately constant temperature by varying current (or voltage), and the changes in current (or voltage), and the flow rate inferred from the variations in current (or voltage). However, each of these measurement techniques can be negatively impacted by fouling.

Various units of measure for flow rate can be used. For example, flow rate may be expressed as a velocity (e.g. distance/time), mass times velocity, mass per unit time, volume per unit time, etc. For example, from a flow velocity measurement, flow volume rate can be calculated by taking into account the dimensions of the open area through which the media is flowing. Various other measures, such as total flow over a given time interval, can also be obtained, as will be appreciated. While high resolution measurements of flow rate or flow volume can be performed, coarse measurements can also be performed.

The nanowire can be a material for which the temperature of the nanowire affects an electrical property of the nanowire. For example, the nanowire can be formed from conductive material, semiconductor material, or doped semiconductor material. However, fouling can affect the conductivity characteristics of the wire. Various semiconductors can be used, including for example silicon, germanium, indium phosphide, other III-V compounds, II-VI compounds, etc. As a particular example, the resistance of silicon and silicon compounds can be strongly dependent upon temperature. Hence, the resistance of a silicon-containing nanowire can be measured to obtain information about the temperature of the nanowire. The nanowire can be heated by applying a current flow through the nanowire. Cooling of the nanowire by the flowing media past the nanowire will cause a change in the resistance of the nanowire. However, in each of these scenarios the measurement accuracy is impacted by fouling.

In addition to adversely altering the performance of hotwire anemometers, other types of precision sensors are also adversely affected by atmospheric foulants. These sensors include microelectromechanical systems (MEMS) and mirrors which operate on many wavelengths. Foulants that form or adhere to the surfaces of such sensors can significantly corrupt the signals. These foulants include all particulate matter from dust to mites, dirt, debris, mold, mold spores, water, water droplets, ice and even local water condensate.

BRIEF SUMMARY OF INVENTION

The invention is various embodiments of devices which are used to solve a significant fouling problem related to precision sensors including microanemometry. A family of anemometers has come to the forefront, which use extremely thin wires. These "nanemometers" or "Acoustic Vector Sensors" are susceptible to atmospheric fouling from dust, dirt, debris and rain when used in the atmosphere. Underwater, they are susceptible to biological fouling from a variety of microorganisms. The present invention uses adaptive materials arranged in a variety of orientations and with a wide range of attachment configurations to induce structural vibrations at extremely high frequencies. These mechanical vibrations cause fouling agents to become detached and accordingly "clean" an otherwise dirty element or wire. They also can be made to vibrate at such frequencies with such intensities that local droplets of water are either shaken off or instantaneously cavitate, thereby allowing the elements to be used in all weather conditions.

There is no comparable technology as micro anemometry is a new class of devices. Similar piezoelectric devices use ultrasonic vibrations to clean a part that is immersed in a fluid via the process of sonication, but because this actively forces foulants away from a surface that is not immersed in a fluid medium, it is completely new to the technical community. This invention is integrated into an existing family of devices and thereby improves the functionality of said device. The present invention has application for Directional Microphones, Anti-Sniper Systems, Submarine Acoustics, Surveillance Systems, Studio Recordings, Ultra-Realistic Studio Acoustics, Aircraft anti-collision systems, ground vehicle anti-collision systems, uninhabited aerial vehicle guidance, navigation and control, nautical anti-collision systems, hearing aids, artificial ears, instantaneous flow sensors for all fluidics applications, homeland security, border patrol, border security, building security, military perimeter intrusion detection, studio and set acoustics production, Some of the embodiments require miniaturization to a level which is challenging for the state of the art. This drives cost up. Most preferred embodiments, however, are quite simple and employ techniques which are quite simple.

One embodiment of the present invention is a method of anti-fouling a filament wire of a sensing device comprising the steps of providing a sensing device having an expose filament wire extending across a gap of support structure. The method can further provide an actuator member constructed of an adaptive material operable to induce an ultrasonic vibration when a charge, force or pressure is applied where said actuator member is arranged with an orientation operable to induce vibrations with a desired orientation. The method can further include attaching the actuator member in an optimal manner to the support structure operable to efficiently transfer the ultrasonic vibration to support structure and the filament wire. The method can further include the step of inducing structural vibrations at extremely high frequencies with the actuator by applying a charge, force or pressure to the adaptive material.

The adaptive material can be a piezoelectric. The piezoelectric (PZT) component can be mounted on a substrate and electrically powered and attached to a mounting structure, which supports the filament. The PZT actuators can convert electrical signals like voltages or charges into mechanical displacements or forces. There is a special class of actuators, which is purposely driven at their resonant frequency, known as ultrasonic transducers. These transducers convert electrical energy into mechanical energy. PZT actuators can be axial actuators, transversal actuators, or flexural actuators. Axial and transversal actuators can have high stiffness and can be optimized for small movements and high forces. Flexural actuators (bimorphs) can be for applications where larger movements are required. Basic versions of the actuator can be an (a) axial actuator or a (b) transversal actuator.

Another embodiment can be a sensing system having an actuator for anti-fouling of the sensing system's filament wire comprising a hot-wire anemometer adapted for sensing fluid flow or wind speed, where said anemometer includes a support member having a gap across which an exposed filament wire extends where said filament wire is part of a sensing mechanism operable to sense fluid flow or wind speed. The system can include an actuator member constructed of an adaptive material operable to induce an ultrasonic vibration when a charge, force or pressure is applied where said actuator member is arranged with an orientation operable to induce vibrations with a desired orientation. The actuator member can be attached in an optimal manner to the support structure operable to efficiently transfer the ultra sonic vibration to the support structure and the filament wire. A charge, force, or pressure inducing mechanism can be operatively interfacing with the adaptive material of said actuator in order to apply a charge, force or pressure to induce the actuator to transmit an ultrasonic vibration. As indicated above the adaptive material can be a PZT.

These and other advantageous features of the present invention will be in part apparent and in part pointed out herein below.

BRIEF DESCRIPTION OF THE DRAWINGS

For a better understanding of the present invention, reference may be made to the accompanying drawings in which:

FIG. 15 is an illustration of a pair of planar sensors with stack actuator

Figure 1:
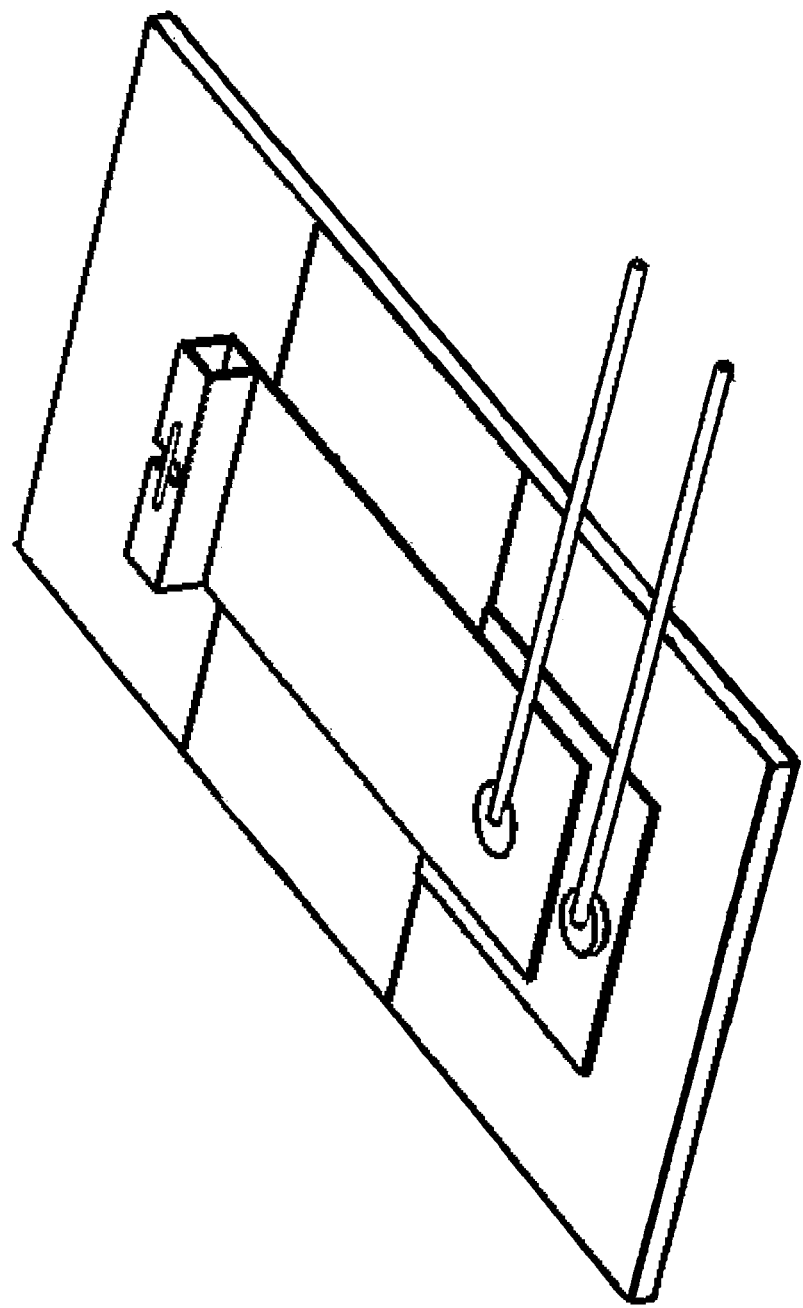
FIG. 1 is a perspective illustration of an actuator.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in FIG. 1-15 and like reference numerals are being used consistently throughout to refer to like and corresponding parts of the invention for all of the various views and figures of the drawing.

One embodiment of the present invention comprising adaptive materials arranged in a variety of orientations and with a wide range of attachment configurations to induce structural vibrations at extremely high frequencies, whereby these mechanical vibrations cause fouling agents to become detached and accordingly "clean" an otherwise dirty element or wire of a hot-wire anemometer. They also can be made to vibrate at such frequencies with such intensities that local droplets of water are either shaken off or instantaneously cavitate, thereby allowing the elements to be used in all weather conditions, which teaches a novel apparatus and method for anti-fouling an anemometer or other form of either linear or planar sensor element.

The details of the invention and various embodiments can be better understood by referring to the figures of the drawing. Referring to FIG. 1 an illustration of an actuator is shown. A piezoelectric (PZT) component is mounted on a substrate and electrically powered and attached to a mounting structure, which supports the boron filament. PZT actuators convert electrical signals like voltages or charges into mechanical displacements or forces. It should be noted that although piezoelectric actuators are specifically called out in this document, other actuator elements can be used, including electrostrictive and/or magnetostrictive actuators which convert electric or magnetic fields to mechanical strains. The operating frequency range of actuators is from static up to many multiples of the first resonant frequency of the mechanical system. Ideally, nested resonant frequencies are used so as to prevent the formation of static nodes which could retain foulants because they do not move very much. As for sensors, a reasonably linear relationship between input signal and movement is required. There is a special class of actuators, which is purposely driven at their resonant frequency, known as ultrasonic transducers. These transducers convert electrical energy into mechanical energy. PZT actuators can be axial actuators, transversal actuators, or flexural actuators. Axial and transversal actuators can have high stiffness and can be optimized for small movements and high forces. Flexural actuators (bimorphs) can be for applications where larger movements are required. If a voltage is applied to an actuator there will be a displacement. When this displacement is blocked, a force will develop, the so-called blocking force, which is, in fact, a measure of the stiffness of the actuator gives a survey the possible stroke-blocking force combinations. Attainable strokes and blocking forces for parallel bimorph elements and high power actuators. Basic versions of actuators are (a) axial actuator; (b) transversal actuator where the resonant frequency for the free element with w and $1 \leq h$ Resonant frequency when one end is attached to a base.

Figure 2:
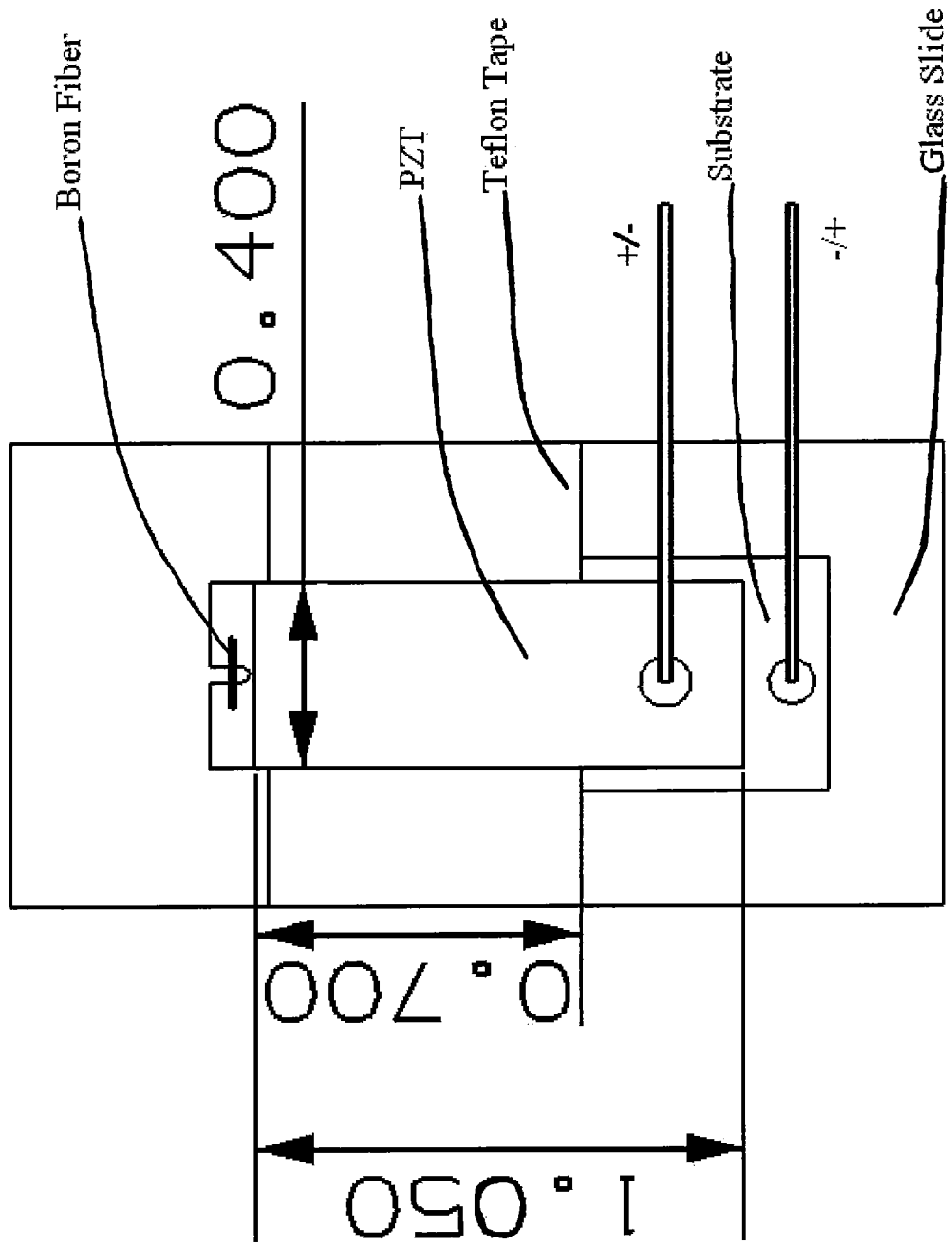
FIG. 2 is an illustration of an actuator with a boron fiber.
Figure 3:
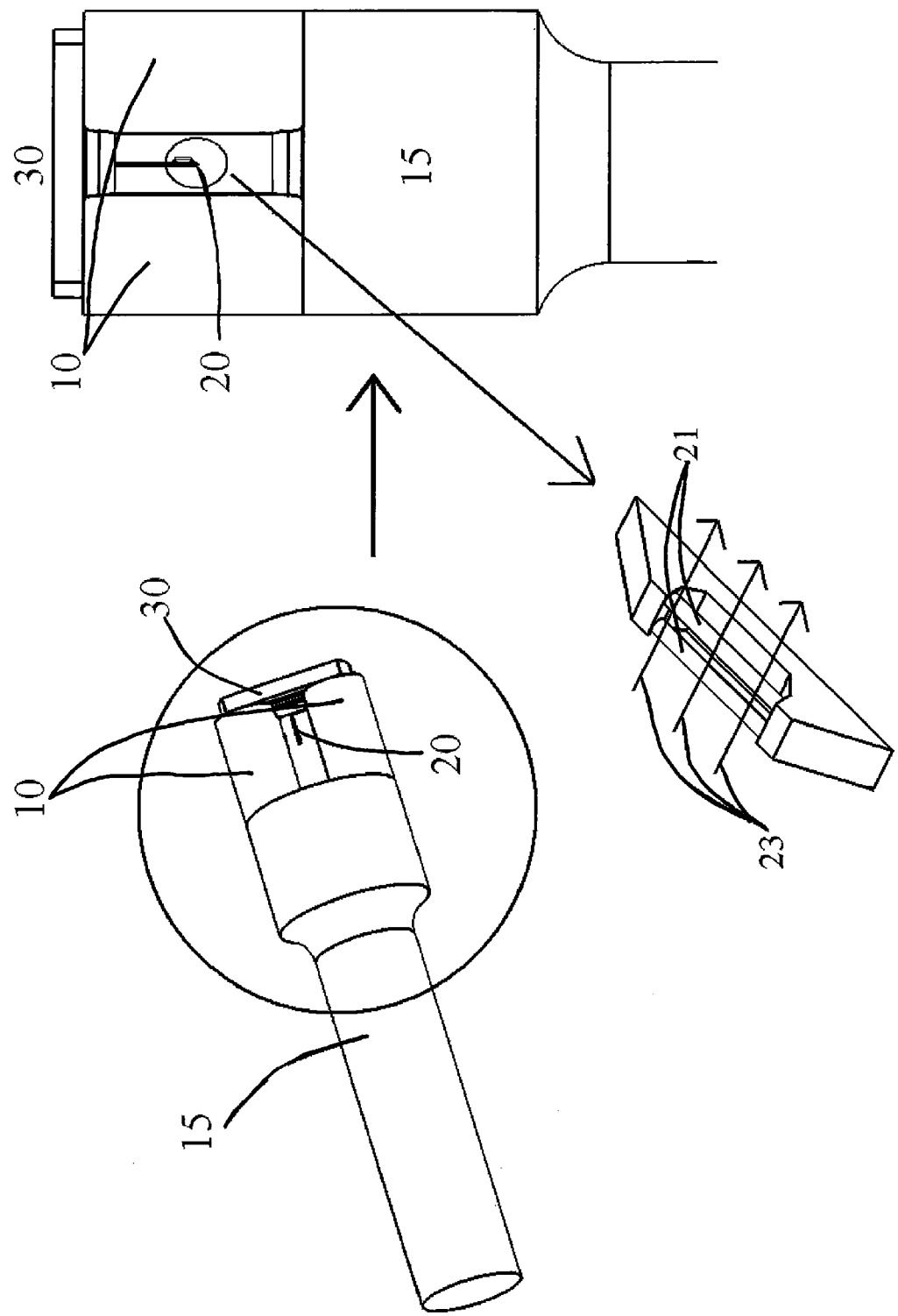
FIG. 3 is an illustration of an element and a probe.

One embodiment of the present invention is an apparatus for anti-fouling a sensing device comprising a sensing device having a sensing member extending across a gap between first and second portions of a support structure and said first and second opposing ends of said sensing member are attached to first and second portions of the support structure respectively. Refer to FIG. 3 for an illustration of this configuration. An actuator member, not shown in FIG. 3 can be constructed of an adaptive material operable to induce an ultrasonic vibration when selectively actuated by applying an input necessary to actuate the adaptive material where said actuator member is arranged with an orientation adapted to induce vibrations with a desired orientation, and where the actuator member is optimally attached to the support structure operable to efficiently transfer an the ultra sonic vibration to the support structure and thereby to the sensing member. Refer to FIGS. 1 and 2 for a representative illustration of an actuator interface to a support member. Again, referring to FIGS. 1 and 2, an energy source adapted to provide the input necessary to actuate the adaptive material can be utilized, such as for example a voltage potential energy source.

The sensing member can be that of an exposed filament wire of a hot-wire anemometer adapted for sensing fluid flow or wind speed. The actuator member can be an elongated actuator strip having a fixed end attached on a substrate, for example with a conductive epoxy, and an opposing actuation end attached to the support structure. A more specific embodiment would be where the elongated actuator strip is a piezoelectric strip adapted to cause axial actuation along its length and the exposed filament wire can be sub-micron sized and oriented laterally with respect to axial actuation. The elongated actuator strip can also be an actuator selected from the group of actuators consisting of an electro-restrictive actuator and a magneto-restrictive actuator.

An electrical voltage source having a voltage input can be applied between the piezoelectric and ground operable to induce axial actuation. The sensing member can also be a sensing member selected from the group of sensing members consisting of a lens, a boron nano-wire, and an acoustic sensor.

Figure 4:
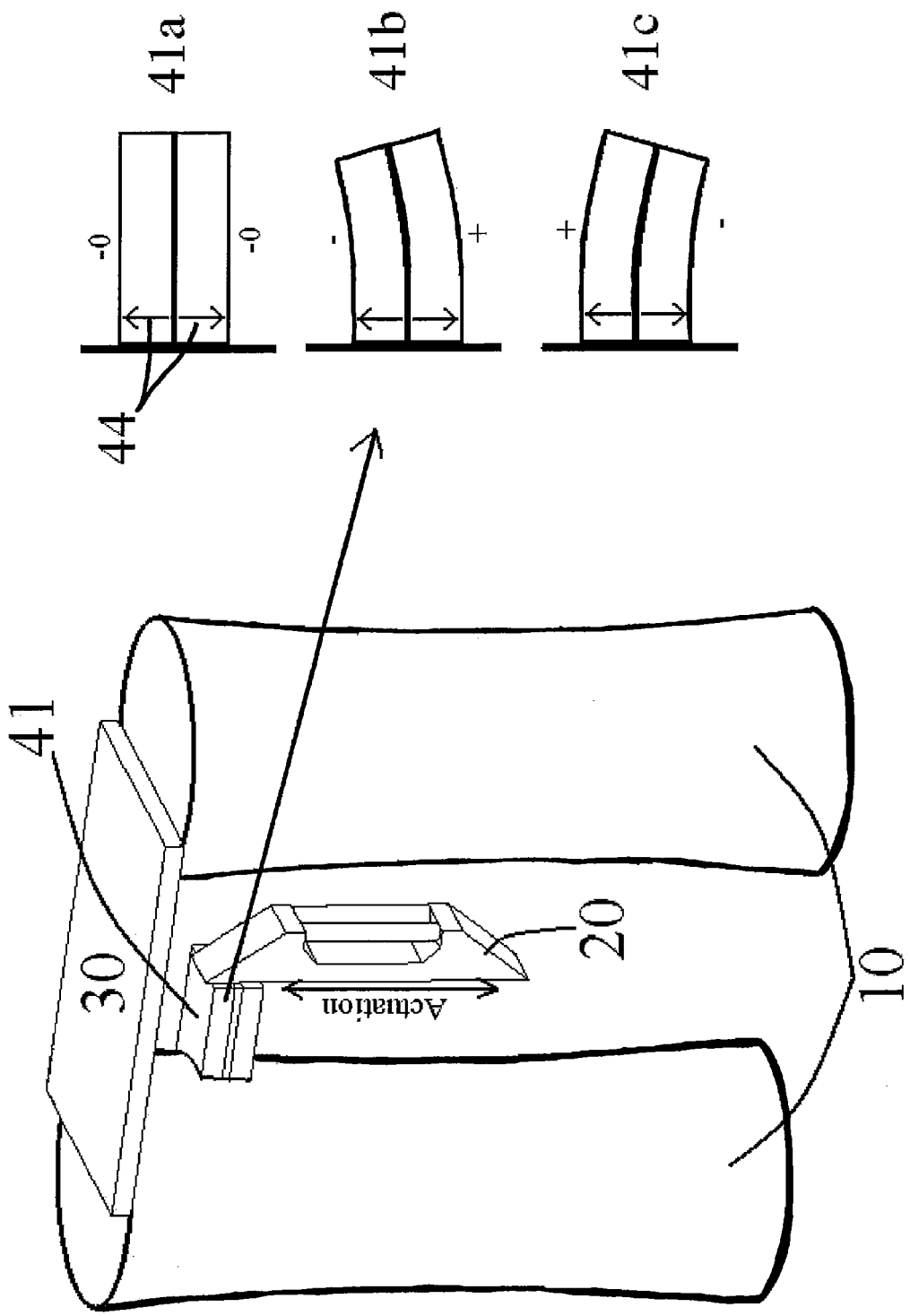
FIG. 4 is an illustration of a Bimorph Actuator in Probe Concept.

Alternatively the actuator member can be an elongated flexural bimorph actuator where a fixed end of the flexural bimorph actuator can be attached to a post structure, as illustrated in FIG. 4, and extending lengthwise there from to a distal actuation end of the flexural bimorph actuator, where the support structure is attached to the distal actuation end proximate said first portion of the support structure. Again an electrical voltage source having a voltage input can apply a voltage input between the piezoelectric and ground operable to induce flexural actuation.

The sensing member can also be a sensing member selected from the group of sensing members consisting of a lens, a boron nano-wire, and an acoustic sensor. The actuator member can also be an actuator selected from the group of actuator members consisting of a charge induced adaptive material actuator, a force induced adaptive material actuator and a pressure induced adaptive material actuator. An actuation energy source can be adapted with an actuation input selected from the group of actuation inputs consisting of a charge input, a force input and a pressure input.

Another embodiment of the invention can be actuator for antifouling a display device comprising an actuator member constructed of an adaptive material operable to induce an ultrasonic vibration when an energy input is applied. The energy input can be a charge input, a force input or a pressure input. The actuator member again can be arranged with an orientation operable to induce vibrations with a desired orientation.

The actuator member can be attached in an optimal manner to a support structure operable to efficiently transfer an the ultra sonic vibration to the support structure and a display device force or pressure to induce the actuator to transmit the ultrasonic vibration.

For example an actuator can be constructed using a 0.01 inch thick PZT strip, an aluminum substrate, and a brass extrusion. The substrate can be attached to the bottom side of one end of the PZT strip using a conductive attaching means like a conducting epoxy. A brass extrusion can be attached to the other end of the PZT strip using an attachment means such as an epoxy as shown in FIG. 1.

Referring to FIG. 2, an illustration of an actuator with a sub-micron sized sensor filament is shown. The device has a substrate with a ground plate attached thereon. A voltage is applied between the PZT strip and ground. The PZT strip can be attached to brass extrusion having a small cut made in the brass extrusion and the boron fiber attached in the space such that a clean section of fiber is spanning the cut as shown in FIG. 2. The piezoelectric (PZT) component can be mounted on a substrate and electrically powered such that actuation is induced at the end of the PZT strip attached to a mounting structure, which supports the boron filament. PZT actuators convert the electrical signals like voltages or charges into mechanical displacements or forces.

Referring to FIG. 3, a preferred embodiment of the element in a probe is shown. The probe arm [15] extends into an air stream, and the probe posts/fairings [10] direct the flow [23] so that it is in line with the probe wires [21]. The element [20] is supported from the top by a cross member [30]. FIG. 3 displays a base configuration without the proposed shaker device for cleaning the wires [21].

FIG. 4 shows a bimorph actuator concept. The actuator [41] would extend from one of the probe posts [10] and shake the element [20] in the manner shown in the Figure. The poling direction [44] determines the direction that the actuator deflects for an applied voltage as shown in the Figure [41a, 41b, 41c]. For this concept, the crossmember [30] can be non-structural and the element is supported entirely by the actuator.

Figure 5:
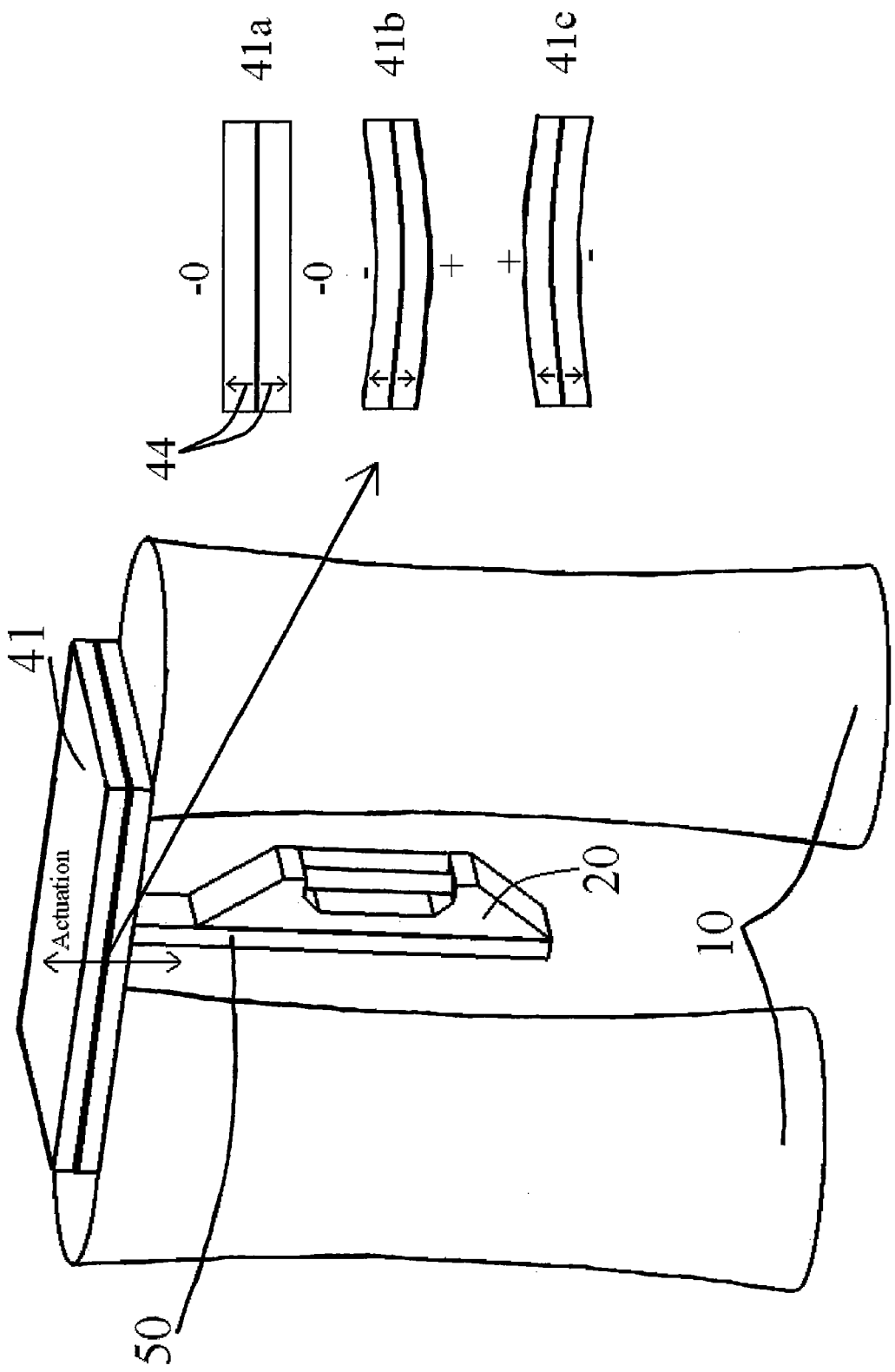
FIG. 5 is an illustration of a Plate Actuator in Probe Concept.

FIG. 5 shows a plate actuator [40] which shakes the element [20] in the manner shown in the Figure. The element is placed between the probe posts [10] and is supported by a vertical member [50]. The actuator consists of two sheets of PZT with the poling direction [44] as shown. When an electrical field is applied the actuator will deflect as shown [41a, 41b, 41c].

Figure 6:
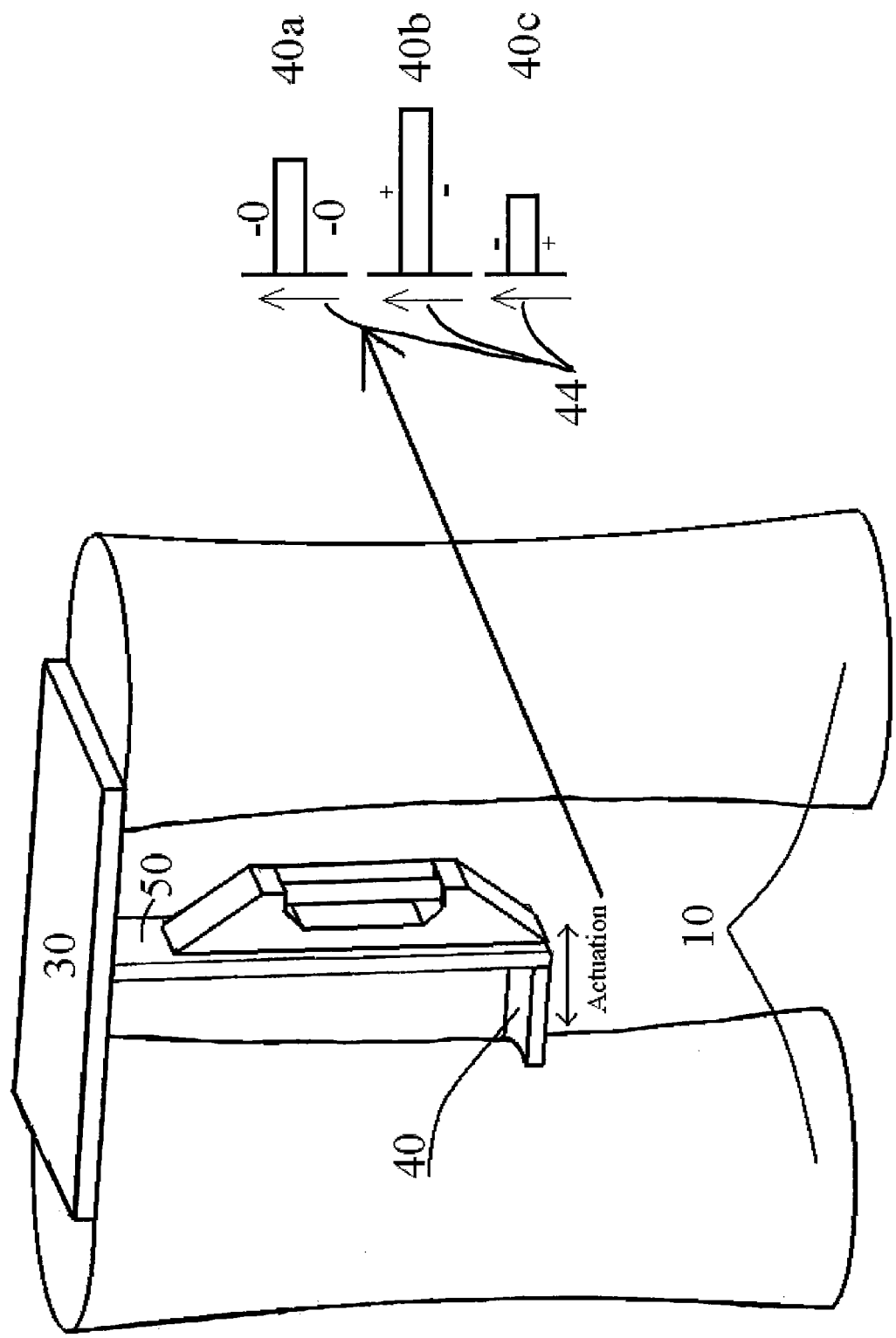
FIG. 6 is a Horizontal Linear Actuator in Probe Concept.

FIG. 6 shows a horizontally oriented linear actuator [40] which is attached to the bottom of the element [20]. The actuator produces deflections as shown [40a, 40b, 40c] and is positioned so that the element is shaken in the manner shown in the Figure. The deflections are dependant on the poling direction [44] and the applied electric field. The element is suspended below the crossmember [30] which spans the probe posts [10] and is supported by a vertical member [50].

Figure 7:
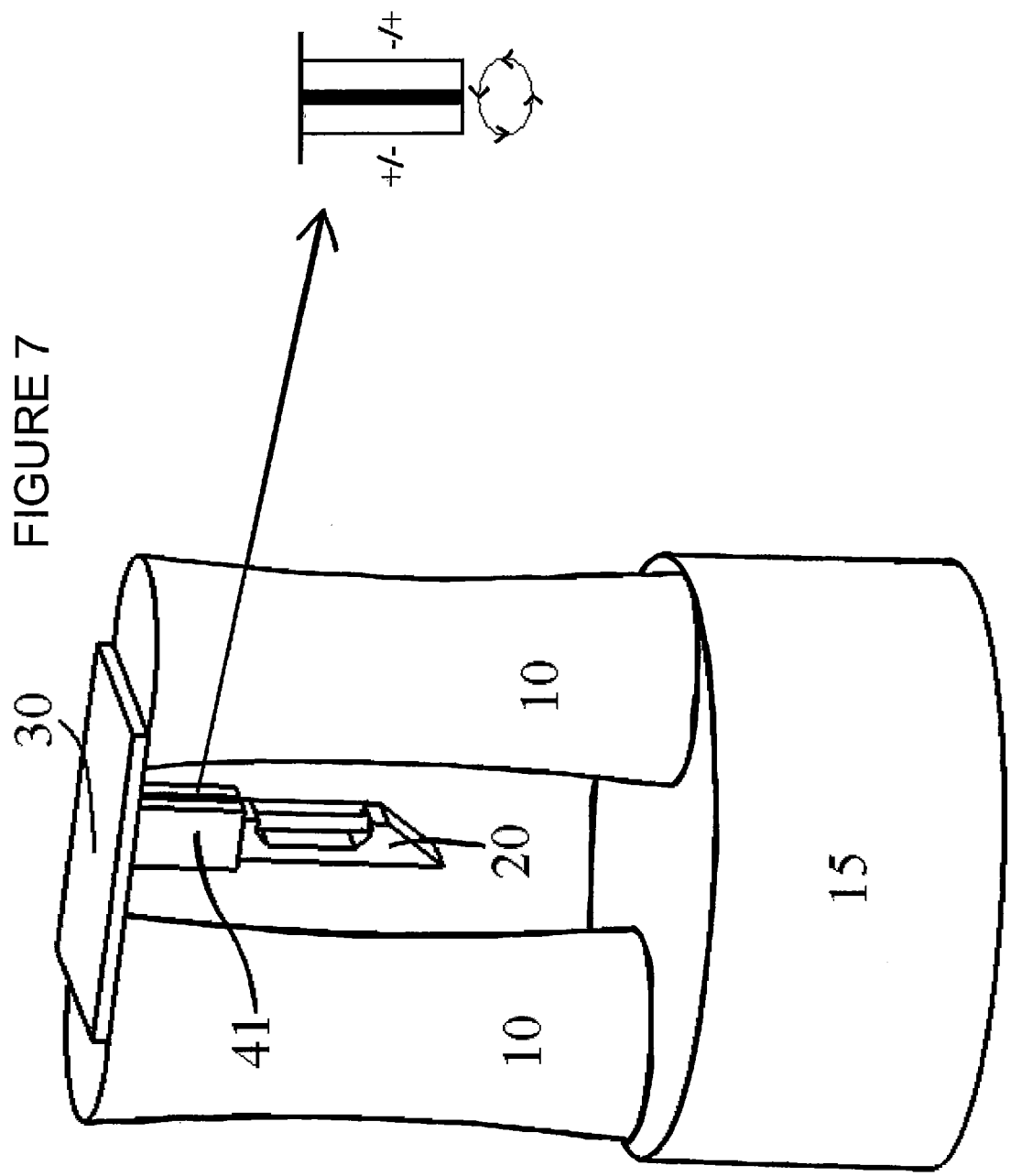
FIG. 7 is an illustration of a Vertical Rotary Actuator Concept.

FIG. 7 shows a concept which utilizes a vertical rotary actuator. The actuator is constructed in the same manner as a bimorph bending actuator, but two separate signals are sent to the two individual PZT layers. The signals are sine waves and are 90 degrees out of phase. These signals result in a tip displacement that follows an elliptical path as shown in the Figure. The element [20] is supported by the actuator [41] which is oriented vertically as shown. The actuator could be rotated 90 degrees so that the tip displacement would be in plane with the probe posts [10] which are mounted on the probe arm [15] instead of being in plane with the element wires as shown. The actuator is fixed at one end by the crossmember [30] which spans the two probe posts.

Figure 8:
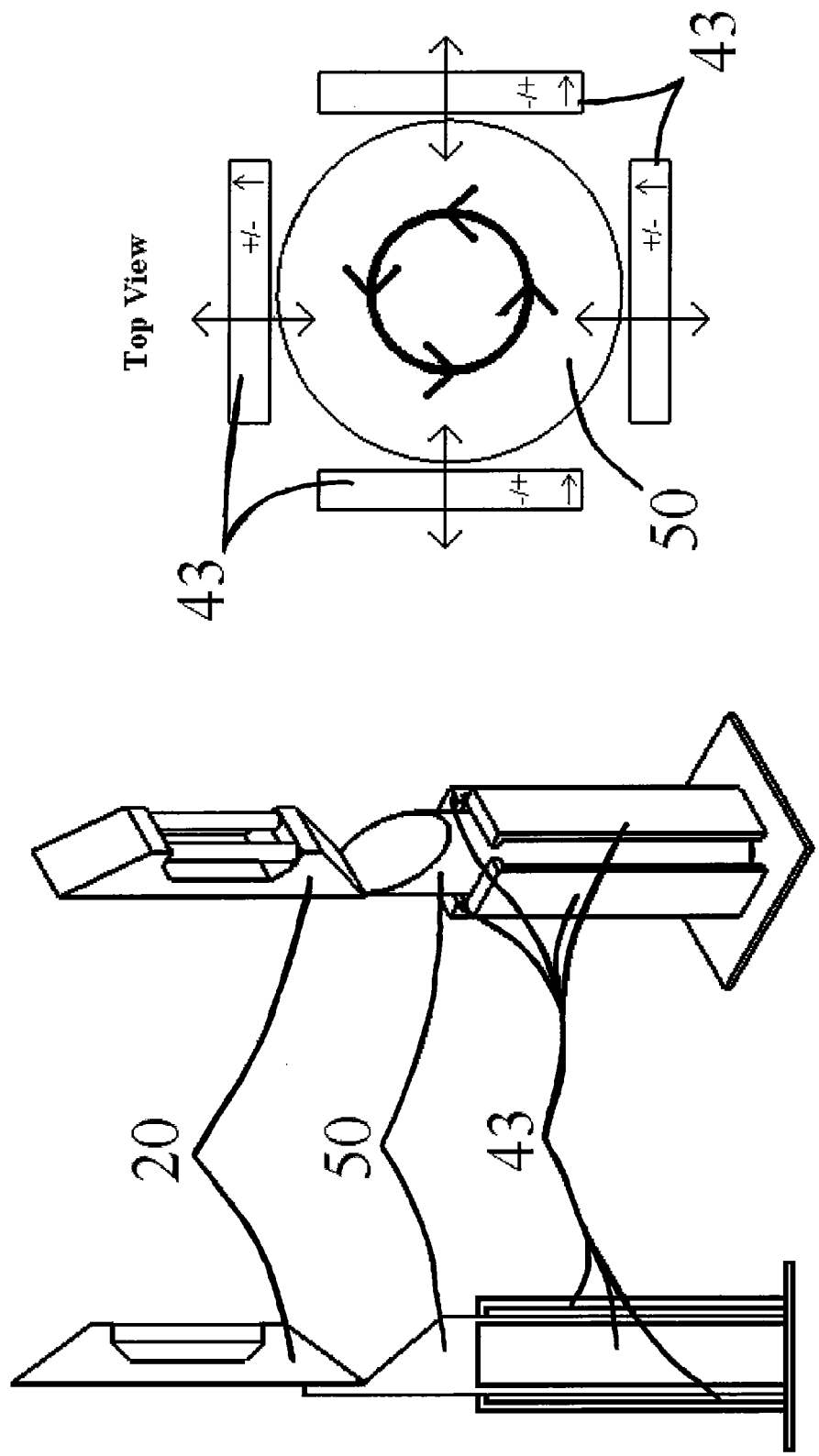
FIG. 8 is an illustration of a Circular Shaker Concept.

FIG. 8 shows a whirl or circular shaker concept with the element [20] mounted on the end. This concept can scale to a size that could vibrate the entire probe assembly as well. The rotary shaker consists of four unimorph bending elements [43], although bimorph elements could be used, which are driven with a sinusoidal signal. The vertical elements shown in the top view are driven in unison and the horizontal elements are driven 90 degrees out of phase of the vertical elements. This action causes a circular motion of the vertical support [50] which is hinged at its base so that the element will travel through the circular tip deflection path, but not spin on its axis.

Figure 9:
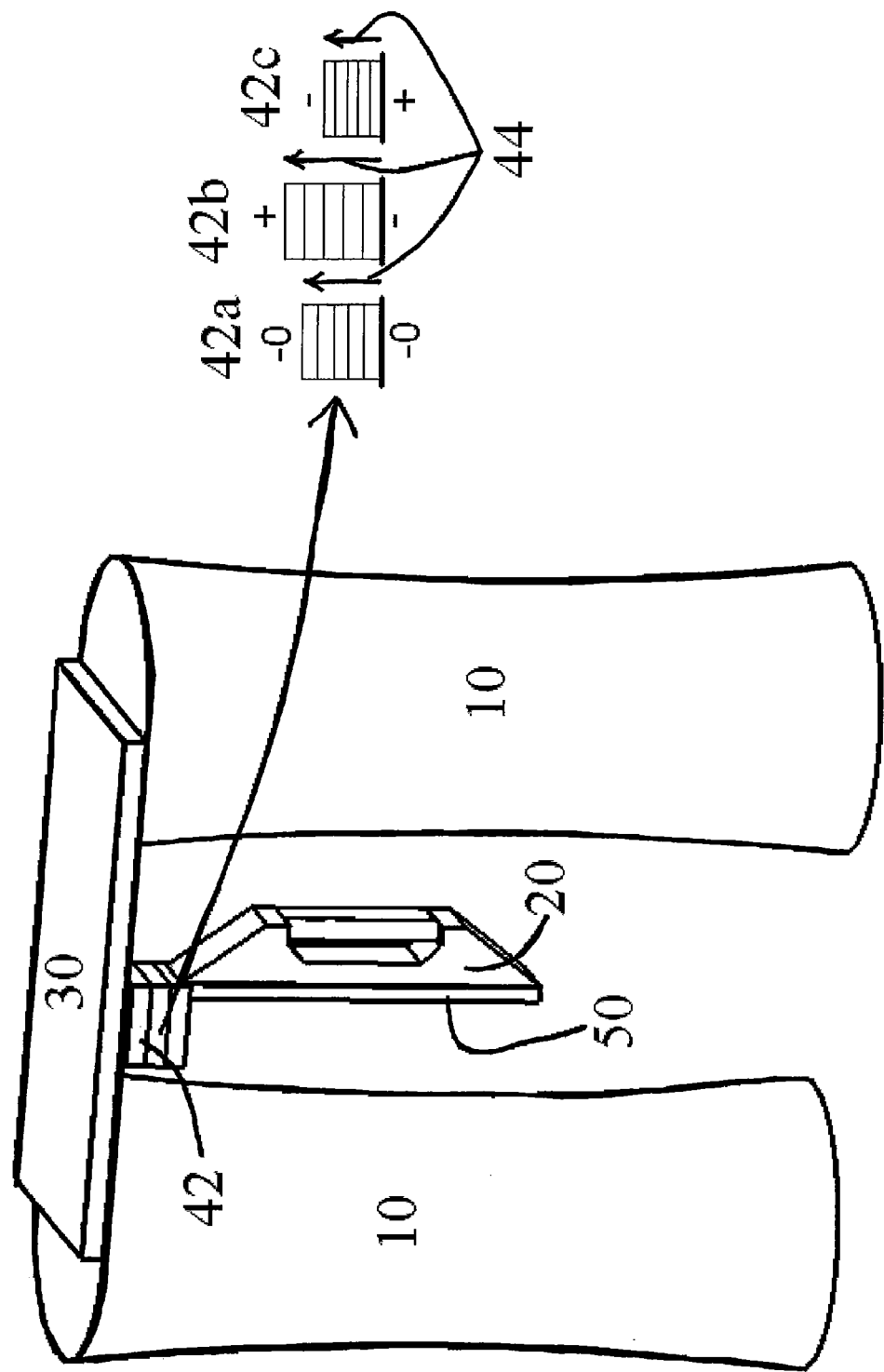
FIG. 9 is an illustration of a Vertical Stack Actuator in Probe.

FIG. 9 shows a stack actuator [42] oriented vertically. A vertical support is attached to the actuator and the element [20] is attached to the vertical support. The stack actuator undergoes deflections [42a, 42b, 42c] which are dependant on the poling direction [44] of the layers and the applied electric field. The actuator is attached at its top to a horizontal crossmember [30] which connects the two probe posts [10].

Figure 10:
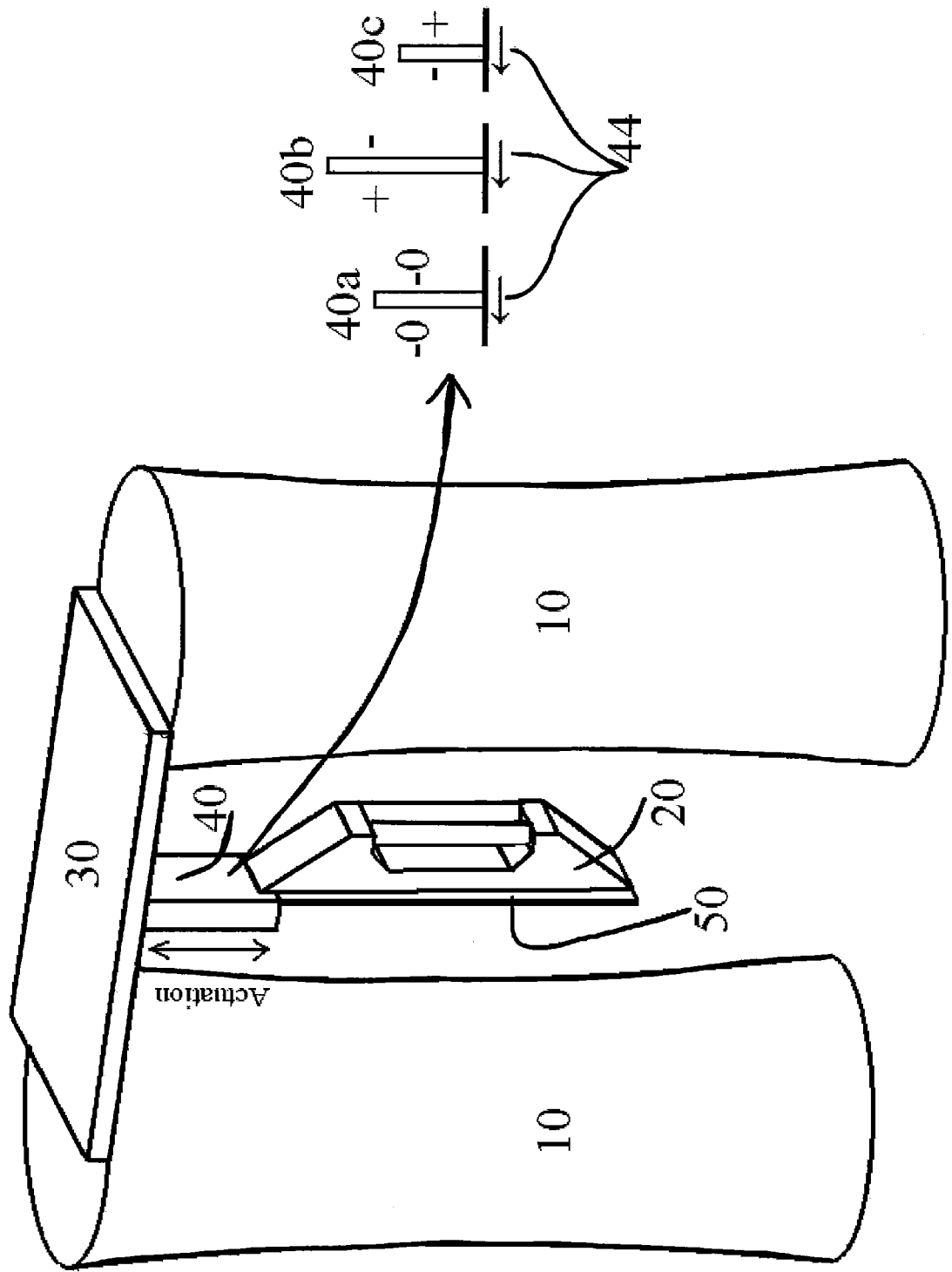
FIG. 10 is an illustration of a Vertical Linear Actuator in Probe.

FIG. 10 shows a linear actuator [40] oriented so that its displacement [40a, 40b, 40c] is vertical as shown. The displacement is dependant on the poling direction [44] of the PZT and the applied electric field. A vertical support [50] is attached to the actuator and the element [20] is attached to this support. The actuator is attached to a cross member [30] at one end and the cross member is supported by the probe posts [10] on either end.

Figure 11:
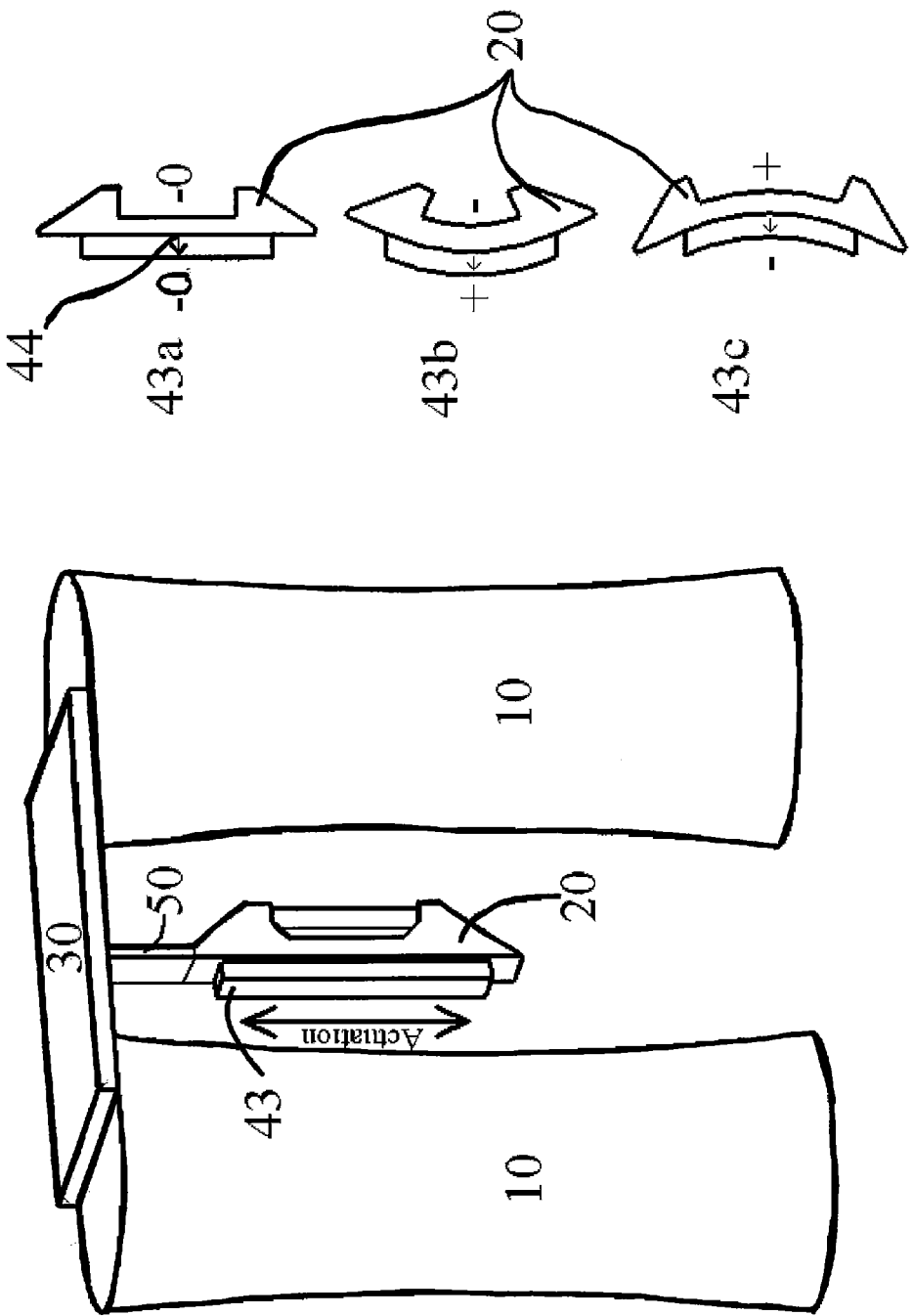
FIG. 11 is an illustration of a Unimorph Element in Probe.

FIG. 11 shows an element [20] with a PZT strip mounted to its back. This configuration acts like a unimorph bending actuator when activated. The deflection, which is dependant on the poling direction [44], of the element [43a, 43b, 43c] is as shown in the Figure and has been exaggerated for clarity. The element is attached to the crossmember [30] by a vertical support [50]. The crossmember is supported at either end by the probe posts [10].

Figure 12:
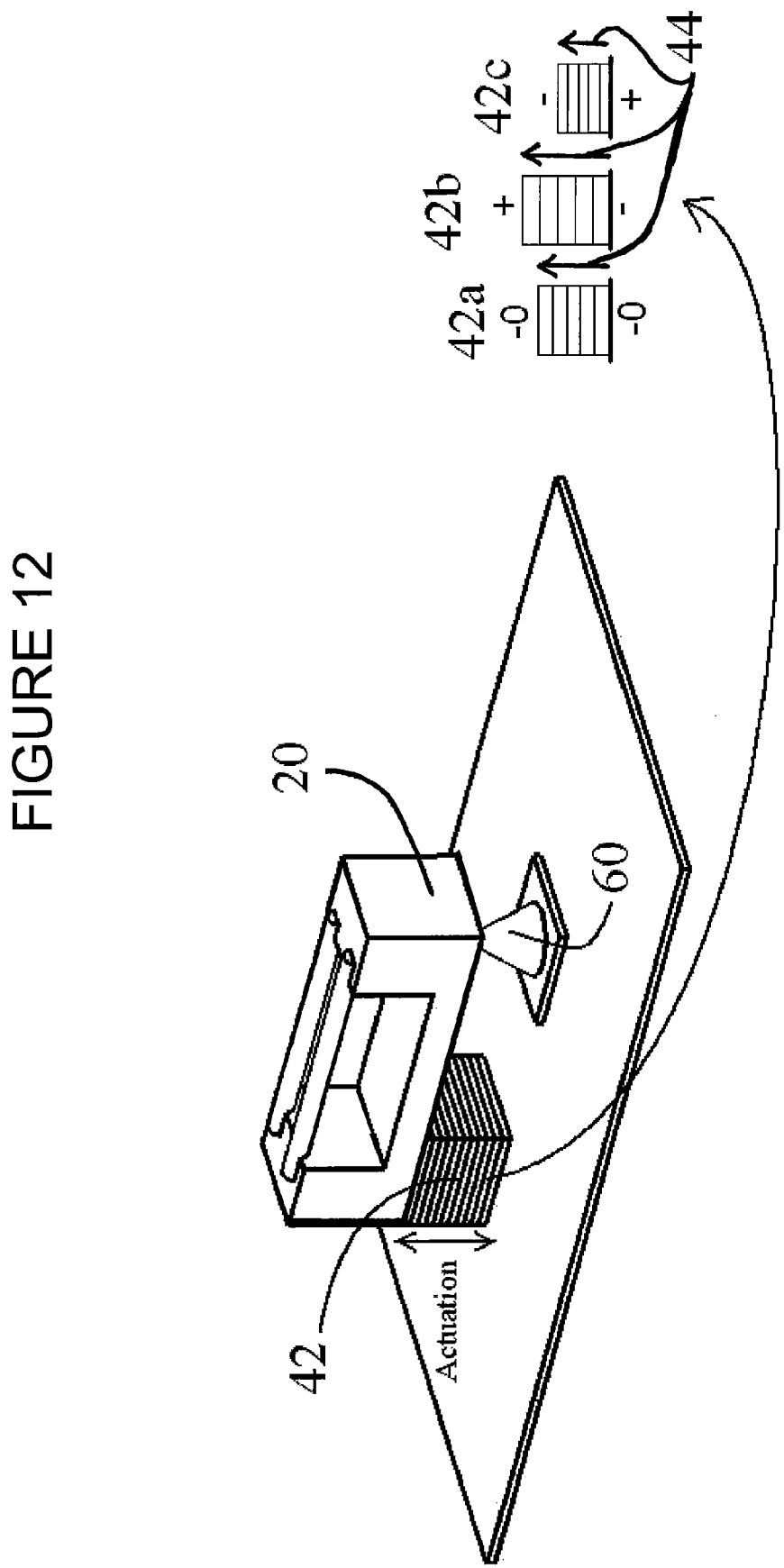
FIG. 12 is an illustration of a Stack Actuator and Pin Supported Element.

FIG. 12 shows a single element [20] that is supported by a stack actuator [42] and a pin connection [60]. The stack undergoes deflections [42a, 42b, 42c] which move one end of the element vertically while the other end is allowed to rotate about the pin connection with zero displacement. The displacement of the actuator is dependant on the poling direction [44] of the layers and the applied electric field.

Figure 13:
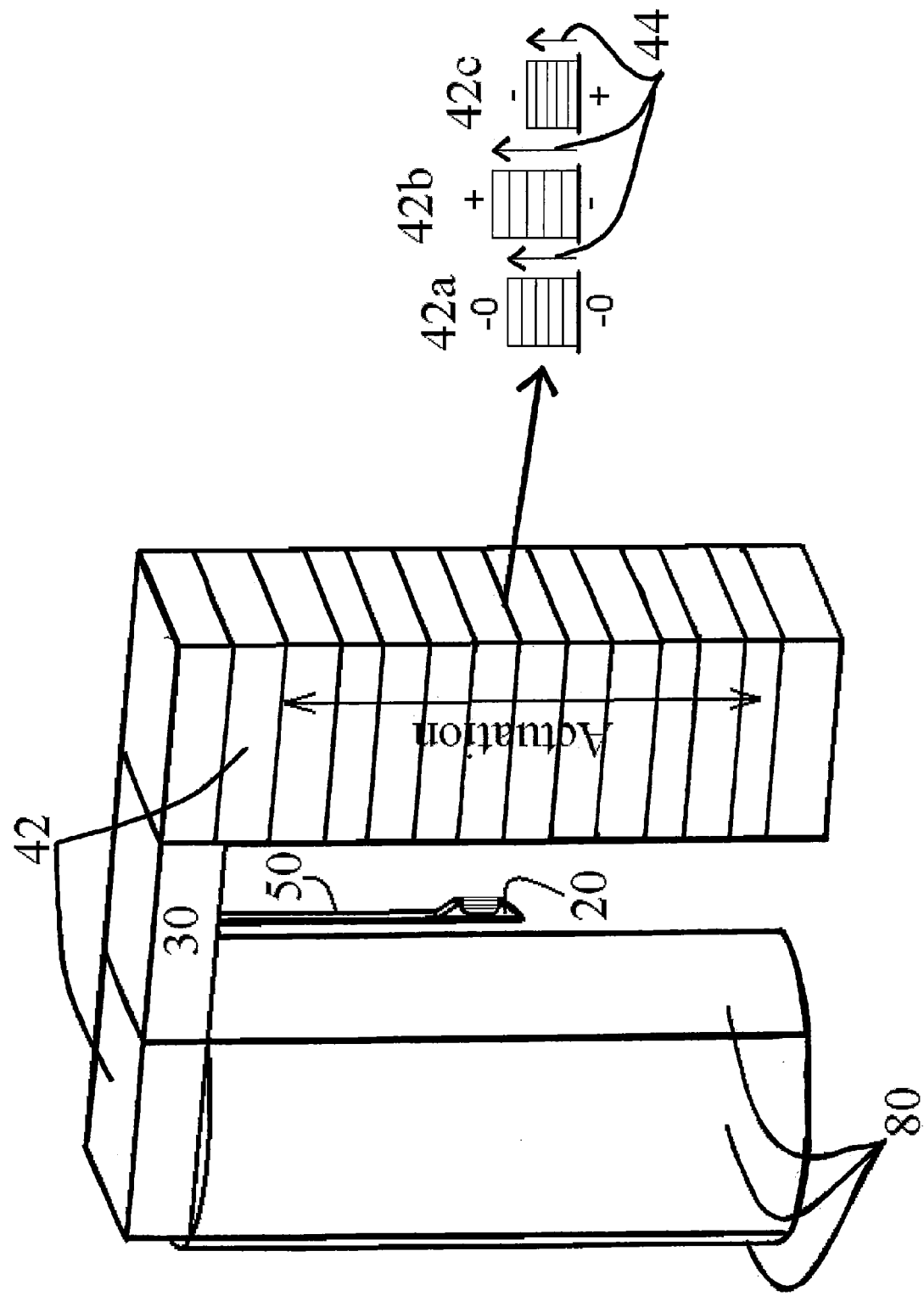
FIG. 13 is an illustration of Stack Actuator Probe Posts.

FIG. 13 shows two stack actuators [42] that are serving as probe posts. One of the actuators is shown with fairings [80] to maintain the aerodynamic function of the probe posts, although the stack actuators could also be constructed with a circular/elliptical profile. The stacks undergo deflections [42a, 42b, 42c] which are dependant on the poling direction [44] of the layers and the applied electric field. The element [20] is suspended from a crossmember [30] by a vertical support [50]. The crossmember is either attached directly to the stacks or to the fairings.

Figure 14:
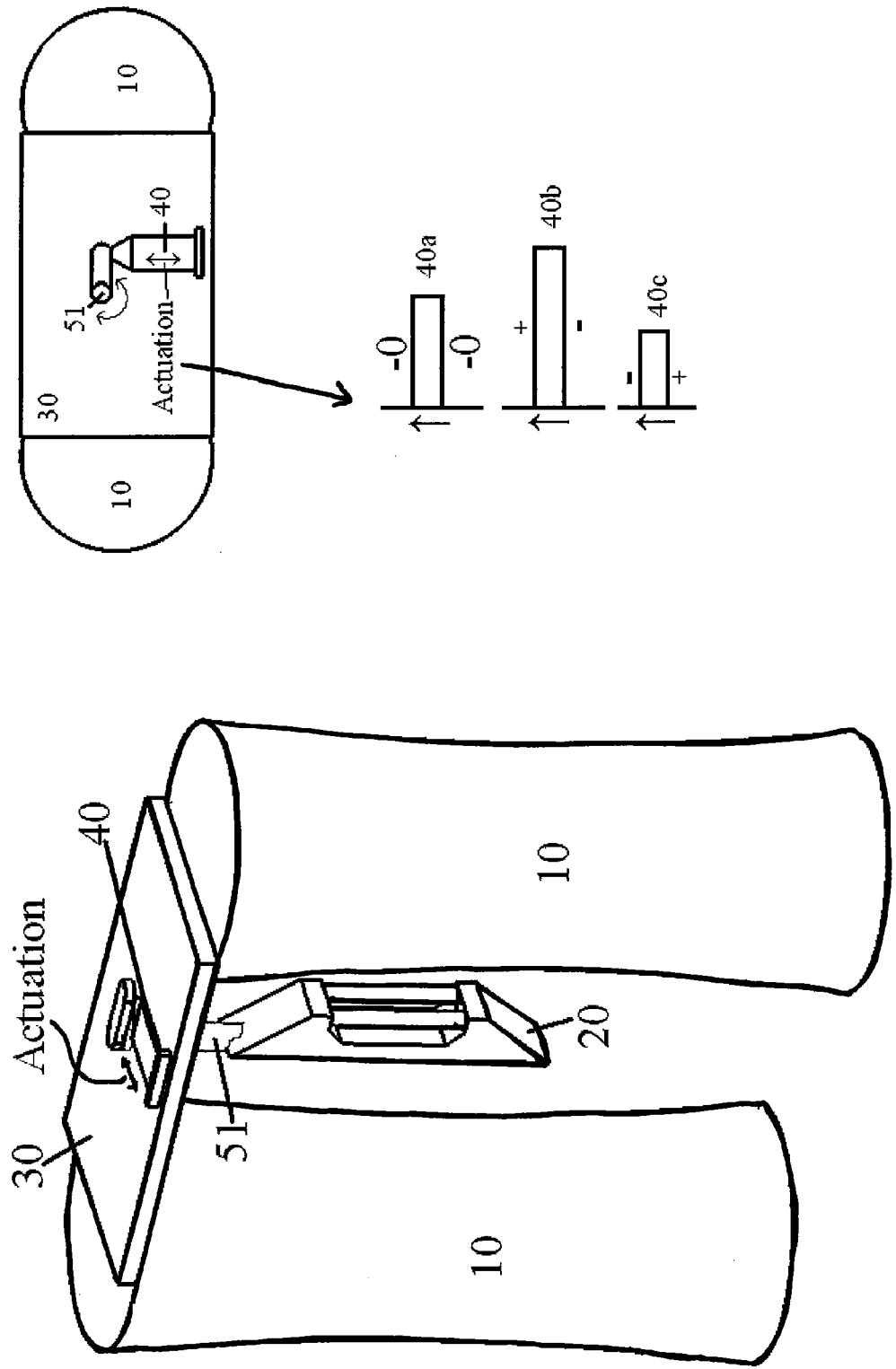
FIG. 14 is an illustration of a Torque Tube Actuation.

FIG. 14 shows a horizontally oriented linear actuator [40] connected to a torque tube [51] upon which the sensor [20] is mounted. The actuator is positioned so that the torque tube will rotate with the PZT actuation [40a, 40b, 40c] which is dependent upon the poling direction and the applied electric field. This assembly is mounted to the crossmember [30] which spans the probe posts [10].

FIG. 15 shows a pair of planar sensor (or display) elements [60(a), 65(a)] perched atop linear actuator stacks [42]. When the actuator stacks are not energized, the planar sensor elements are essentially still and as has been shown in many field operations, collect foulants. When actuators [42] are actuated with a variety of high frequency waveforms, the sensor (or display) elements mechanically throw off foulants, and are accordingly "self-cleaning."

The above outlined mechanical configurations can be utilized or other configurations base on the particular application, environment and/or the configuration of the sensing device. Multiple mechanical configurations can also be combined to provide combination actuations for more effective anti-fouling. The structure and material utilized for the filament wire can also determine the actuator configuration.

Testing demonstrated the efficacy of anti-fouling of 10 mil (254 μm) diameter boron filaments which were ultrasonically vibrated to remove dust particles. The particles consisted of 2 to 110 μm diameter particles. Artificially generated dust consisted primarily of chalk dust mixed with glass beads. Naturally occurring atmospheric foulants also adhered to the boron test filaments electro-statically. In both cases the particles were successfully removed by exposing the filaments to ultrasonic vibrations. The frequency of vibration can be about approximately 20 kHz +/−5 kHz and the applied voltage can be about approximately +/−30 volts. The Microflown acoustic vector sensor uses two strips of platinum which are resistively heated to detect a sound source. However, the wires are open to the environment and are therefore susceptible to environmental debris. To counteract this, an ultrasonic actuator is proposed that will remove foreign debris through mechanical vibration. A boron fiber can be used to simulate the platinum sensing wires of the Microflown sensor for testing purposes. The fiber can be coated with dust to simulate foreign debris and then vibrated. Because the boron filament is much stiffer than the filaments of the MicroFlown sensor and yet can still be cleaned by this method, this a conservative relationship, essentially ensuring that all lower stiffness linear sensor element structures like those used in MicroFlown type devices and conventional hot-wire anemometers can be successfully cleaned by this approach and class of devices.

To vibrate the fiber, an actuator can be constructed using a 0.01 inch thick PZT strip, an aluminum substrate, and a brass extrusion. The substrate can be attached to the bottom side of one end of the PZT strip using conducting epoxy, and the brass extrusion can be attached to the other end of the PZT strip using an epoxy as shown in FIG. 1. The substrate can be attached to a microscope slide using an epoxy. A small cut can be initially made in the brass extrusion and the boron fiber can be attached in place such that a clean section of fiber is spanning the cut. Care must be taken when attaching the substrate to the PZT and when attaching the substrate to the slide.

The dimensions of the actuator used for testing can be as shown in FIG. 3. The overall dimensions of the actuator are deemed to be unimportant and so there is no need to control them. Several actuators were made with very different dimensions and they all performed the same.

A signal generator and power source can be utilized to excite the actuator, and observations can be made using a microscope. Before placing the actuator on the microscope, the fiber was dusted. Ordinary dust from surfaces can be used for testing purposes, and dust consisting of chalk dust and glass beads can be used for testing. The first test used ordinary dust gathered from surfaces. Observation of the wire before vibration, and after vibration demonstrated that the dust can be successfully removed. The frequency of vibration was about approximately 20 kHz +/−5 kHz and the applied voltage was +/−30 volts. At this frequency an audible noise was generated as lower frequency structural sub-harmonics were excited. This noise could be eliminated by increasing the frequency to 30 kHz which had no ill effect on the actuator. The second test conducted used glass beads and chalk dust. Observation of the fiber before and after vibration show the chalk dust clearly, but before vibrating the fiber, visible chalk smudges were present on the fiber, which were successfully removed.

As can be seen in the preceding section, dust particles were successfully removed from the boron fiber. This simulation of a Microflown sensor shows a method and apparatus for removing foreign debris from the sensing wires. In order to avoid interference with the sensors operation due to the potential audible noise that can be caused by the actuator during vibration, use of the vibration to clean the wires could occur periodically so that there is no side effect of the cleaning due to audible noise which can detrimental to the sensors operation. The noise could further reduce the effectiveness of the sensor in the field because it could give the position of the sensor away to potential threats. The actuator used for this test was operated at an inaudible frequency successfully, and it is reasonable to conclude that the particles could be removed at this frequency as well.

The boron fiber was only vibrated across its diameter, but the particles could also be removed effectively if the fiber is vibrated along its length depending on the structure, configuration and material of the device. Also, the Microflown sensor can use two parallel wires and for testing purposes only a single fiber was used.

The various anti-fouling device examples shown above illustrate a novel method and apparatus for anti-fouling a hot-wire anemometer. A user of the present invention may choose any of the above anti-fouling device embodiments, or an equivalent thereof, depending upon the desired application. In this regard, it is recognized that various forms of the subject anemometer anti-fouling device could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A method of anti-fouling a sensing device comprising the steps of:
   providing a sensing device having a sensing member extending across a gap between first and second portions of a support structure and first and second opposing ends of said sensing member are attached to first and second portions of the support structure respectively;
   providing an actuator member constructed of an adaptive material operable to induce an ultrasonic vibration when selectively actuated by applying an input necessary to actuate the adaptive material where said actuator member is arranged with an orientation adapted to induce vibrations with a desired orientation;
   attaching the actuator member in an optimal manner to the support structure operable to efficiently transfer the ultra sonic vibration to the support structure and thereby to the sensing member; and
   inducing structural ultrasonic vibrations with the actuator by applying the input necessary to actuate the adaptive material,
   where said sensing member is an exposed filament wire of a hot-wire anemometer adapted for sensing fluid flow or wind speed, and
   where the actuator member is an elongated actuator strip having a fixed end attached on a substrate and an opposing actuation end attached to the support structure.

2. The method of anti-fouling as recited in claim 1, where the elongated actuator strip is a piezoelectric strip adapted to cause axial actuation along its length and the exposed filament wire is sub-micron sized and oriented laterally with respect to axial actuation.

3. The method of anti-fouling as recited in claim 2, where the elongated actuator strip is an actuator selected from the group of actuators consisting of an electro-restrictive actuator and a magneto-restrictive actuator.

4. The method of anti-fouling as recited in claim 2, further comprising the step of applying an electrical voltage between the piezoelectric and ground thereby inducing axial actuation.

5. The method of anti-fouling as recited in claim 4, where the sensing member is a sensing member selected from the group of sensing members consisting of a lens, a boron nano-wire, and an acoustic sensor.

6. The method of anti-fouling as recited in claim 1, where the actuator member is an elongated flexural bimorph actuator and where a fixed end of the flexural bimorph actuator is attached to a post structure and extending lengthwise there from to a distal actuation end of the flexural bimorph actuator, where the support structure is attached to the distal actuation end proximate said first portion of the support structure.

7. The method of anti-fouling as recited in claim 6, further comprising the step of applying an electrical voltage between the piezoelectric and ground thereby inducing flexural actuation.

8. The method of anti-fouling as recited in claim 7, where the sensing member is a sensing member selected from the group of sensing members consisting of a lens, a boron nano-wire, and an acoustic sensor.

9. The method of anti-fouling as recited in claim 1, where the actuator member is one selected from a group of actuator members consisting of a charge induced adaptive material actuator, a force induced adaptive material actuator and a pressure induced adaptive material actuator.

10. The method of anti-fouling as recited in claim 9, further comprising the step of:
    inducing structural ultrasonic vibrations with the actuator member by applying an actuation input selected from the group of actuation inputs consisting of a charge input, a force input and a pressure input.

11. The method of anti-fouling as recited in claim 1, where the sensing member is a sensing member selected from the group of sensing members including a sensing member having a planar chemical sensing surface and a sensing member having an electromechanical sensing member.

12. The method of anti-fouling as recited in claim 1, where the sensing member is a sensing member selected from the group of sensing members including a sensing member having a curvilinear chemical sensing surface and a sensing member having an electromechanical sensing member.

13. An apparatus for anti-fouling a sensing device comprising:
    a sensing device having a sensing member extending across a gap between first and second portions of a support structure and first and second opposing ends of said sensing member are attached to first and second portions of the support structure respectively;
    an actuator member constructed of an adaptive material operable to induce an ultrasonic vibration when selectively actuated by applying an input necessary to actuate the adaptive material where said actuator member is arranged with an orientation adapted to induce vibrations with a desired orientation, where the actuator member is optimally attached to the support structure operable to efficiently transfer the ultra sonic vibration to the support structure and thereby to the sensing member; and
    an energy source adapted to provide the input necessary to actuate the adaptive material,
    where said sensing member is an exposed filament wire of a hot-wire anemometer adapted for sensing fluid flow or wind speed, and
    where the actuator member is an elongated actuator strip having a fixed end attached on a substrate and an opposing actuation end attached to the support structure.

14. The apparatus for anti-fouling as recited in claim 13, where the elongated actuator strip is a piezoelectric strip adapted to cause axial actuation along its length and the exposed filament wire is sub-micron sized and oriented laterally with respect to axial actuation.

15. The apparatus for anti-fouling as recited in claim 14, where the elongated actuator strip is an actuator selected from the group of actuators consisting of an electro-restrictive actuator and a magneto-restrictive actuator.

16. The apparatus for anti-fouling as recited in claim 14, further comprising:
    an electrical voltage source having a voltage input applied between the piezoelectric and ground operable to induce axial actuation.

17. The apparatus for anti-fouling as recited in claim 16, where the sensing member is a sensing member selected from the group of sensing members consisting of a lens, a boron nano-wire, and an acoustic sensor.

18. The apparatus for anti-fouling as recited in claim 13, where the actuator member is an elongated flexural bimorph actuator and where a fixed end of the flexural bimorph actuator is attached to a post structure and extending lengthwise there from to a distal actuation end of the flexural bimorph actuator, where the support structure is attached to the distal actuation end proximate said first portion of the support structure.

19. The apparatus for anti-fouling as recited in claim 18, further comprising:
   an electrical voltage source having a voltage input applied between the piezoelectric and ground operable to induce flexural actuation.

20. The apparatus for anti-fouling as recited in claim 19, where the sensing member is a sensing member selected from the group of sensing members consisting of a lens, a boron nano-wire, and an acoustic sensor.

21. The apparatus for anti-fouling as recited in claim 13, where the actuator member is an actuator selected from the group of actuator members consisting of a charge induced adaptive material actuator, a force induced adaptive material actuator and a pressure induced adaptive material actuator.

22. The Apparatus for anti-fouling as recited in claim 21, further comprising:
   an actuation energy source adapted with an actuation input selected from the group of actuation inputs consisting of a charge input, a force input and a pressure input.

* * * * *